No. 842,681.    PATENTED JAN. 29, 1907.
G. H. MAYNE.
COB BREAKER OR CRUSHER.
APPLICATION FILED MAR. 19, 1904.

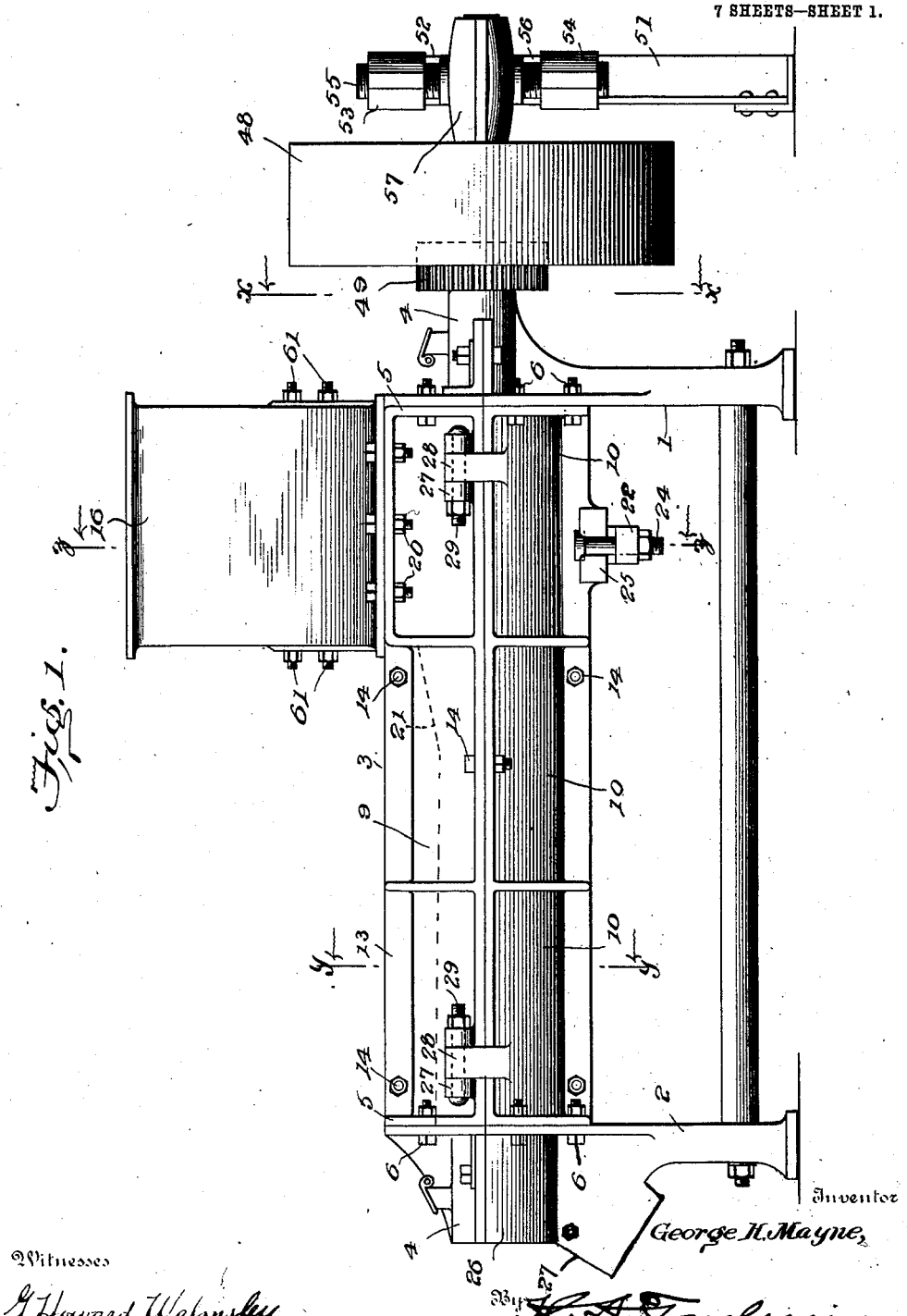

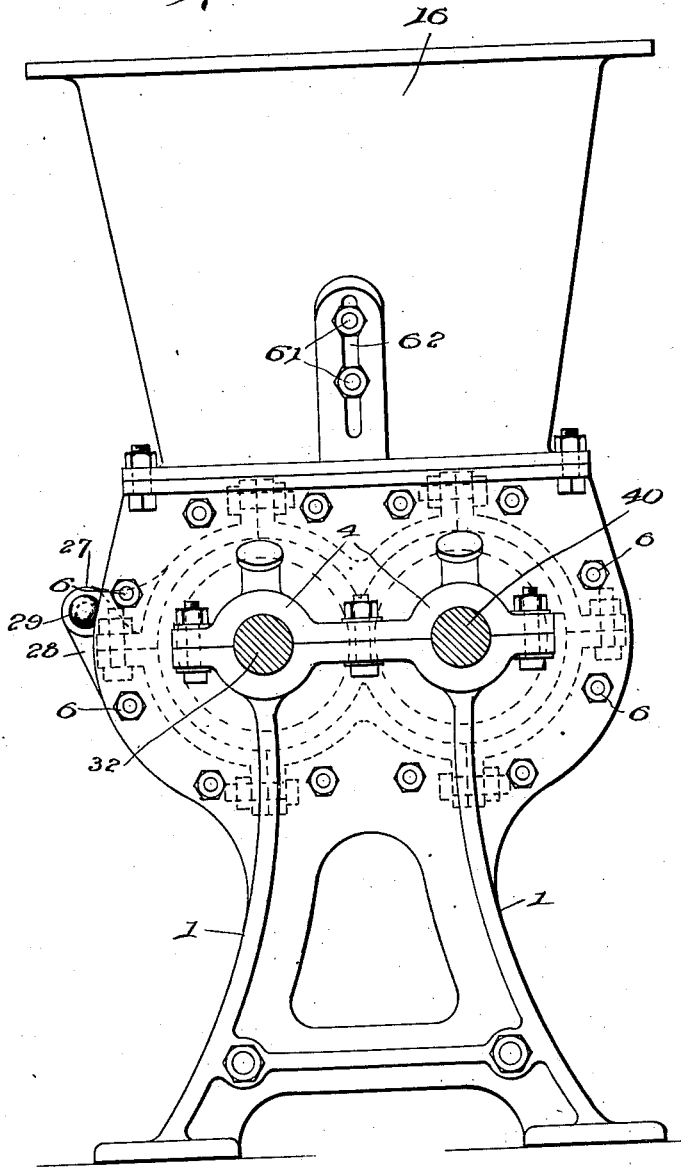

7 SHEETS—SHEET 3.

Witnesses
G. Howard Walmsley.

Inventor
George H. Mayne,
By H. H. Toulmin,
Attorney

No. 842,681. PATENTED JAN. 29, 1907.
G. H. MAYNE.
COB BREAKER OR CRUSHER.
APPLICATION FILED MAR. 19, 1904.
7 SHEETS—SHEET 4.
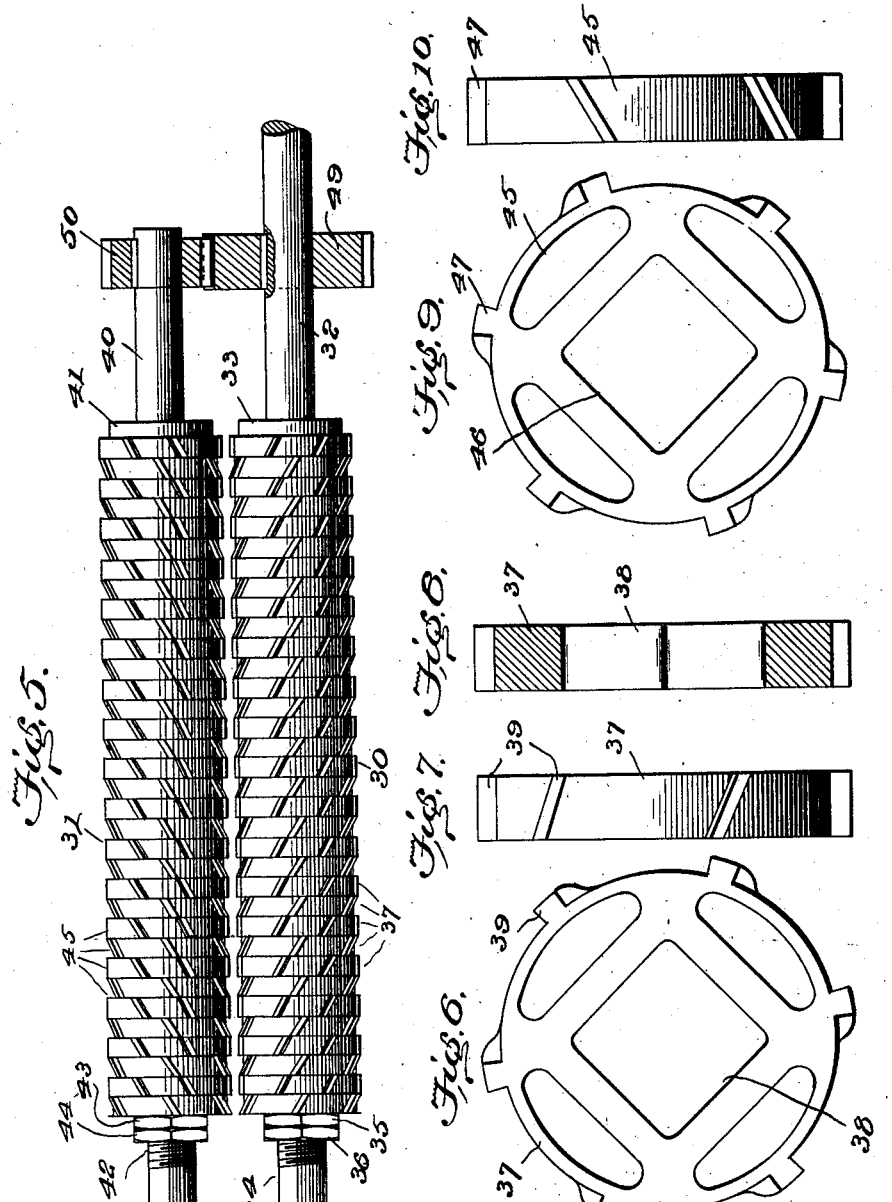

No. 842,681. PATENTED JAN. 29, 1907.
G. H. MAYNE.
COB BREAKER OR CRUSHER.
APPLICATION FILED MAR. 19, 1904.
7 SHEETS—SHEET 5.
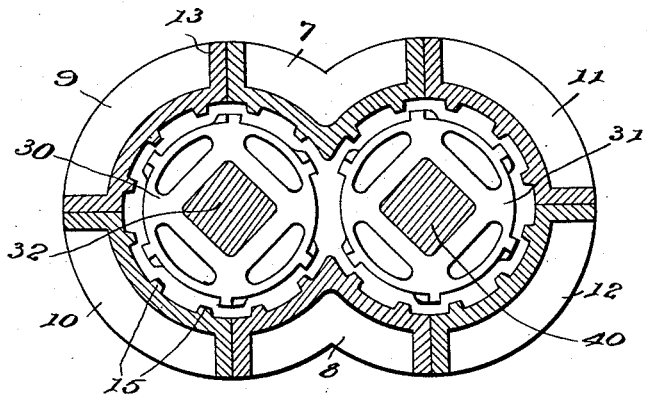
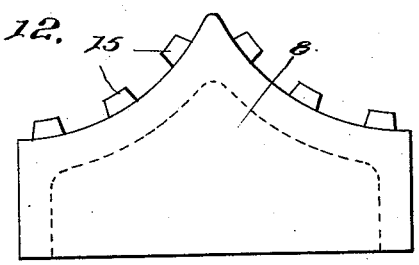
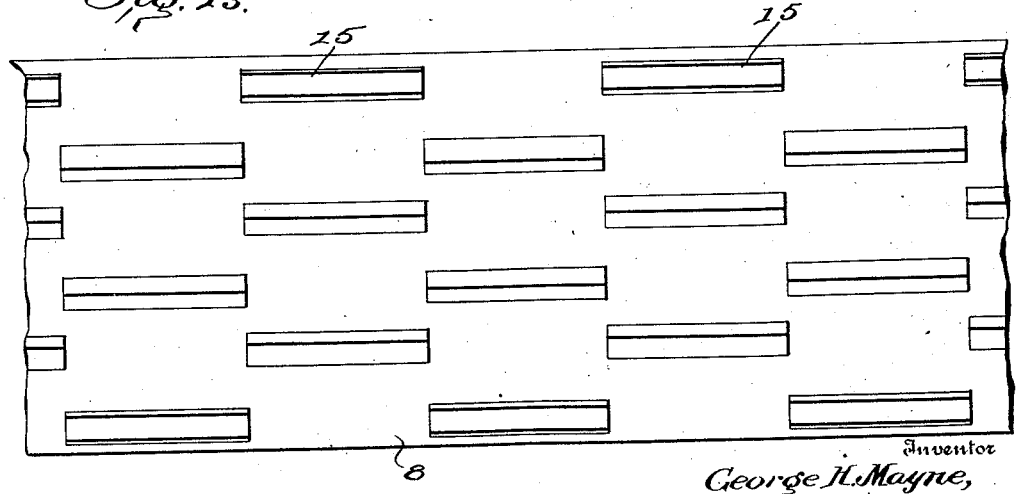
Witnesses
G. Howard Walmsley.
Ivorie Miller.
Inventor
George H. Mayne,
By H. A. Toulmin
Attorney No. 842,681. PATENTED JAN. 29, 1907.
G. H. MAYNE.
COB BREAKER OR CRUSHER.
APPLICATION FILED MAR. 19, 1904.

7 SHEETS—SHEET 6.

Witnesses
G. Howard Walmsley
Irvine Miller

Inventor
George H. Mayne,
By H. A. Toulmin
Attorney

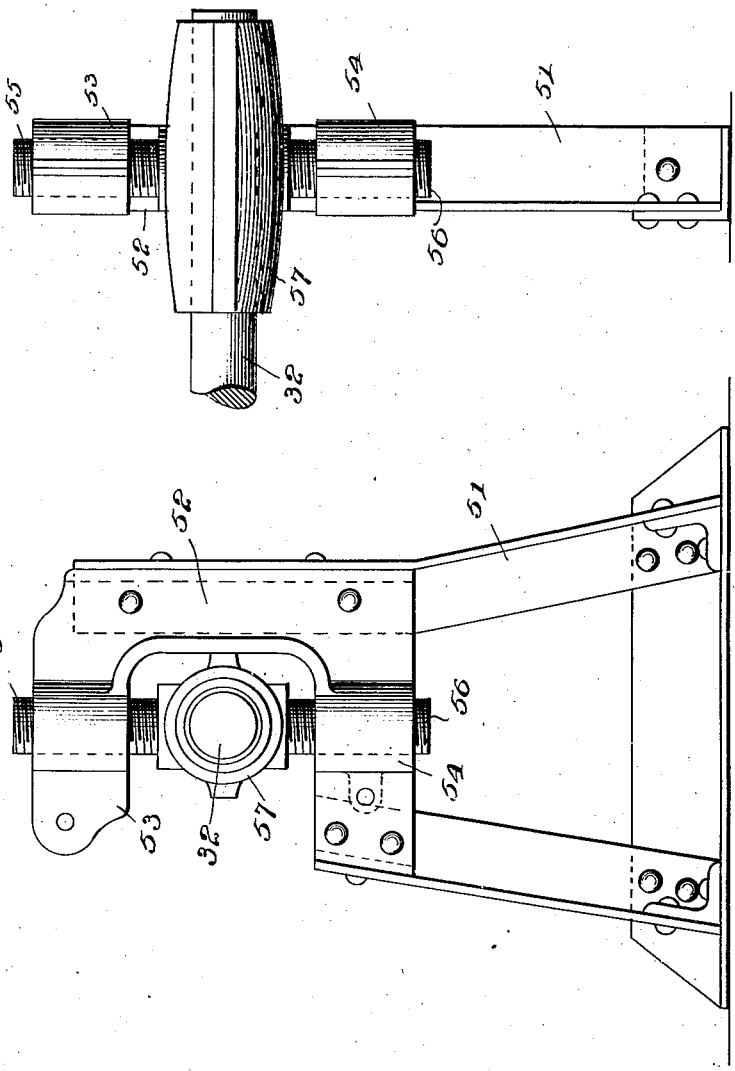

UNITED STATES PATENT OFFICE.

GEORGE H. MAYNE, OF SPRINGFIELD, OHIO, ASSIGNOR TO THE FOOS MANUFACTURING COMPANY, OF SPRINGFIELD, OHIO, A CORPORATION OF OHIO.

COB BREAKER OR CRUSHER.

No. 842,681.  Specification of Letters Patent.  Patented Jan. 29, 1907.

Application filed March 19, 1904. Serial No. 198,941.

*To all whom it may concern:*

Be it known that I, GEORGE H. MAYNE, a citizen of the United States, residing at Springfield, in the county of Clark and State of Ohio, have invented certain new and useful Improvements in Cob Breakers or Crushers, of which the following is a specification, reference being had therein to the accompanying drawings.

This invention relates to cob breakers or crushers or, in other words, to a structure designed, primarily, for breaking or crushing corncobs or ear-corn, although it is of course adapted to operate upon other materials.

The invention has for its object to provide a structure of this character which shall be of high efficiency and capacity, readily assembled and renewable as to worn or broken parts, and at the same time simple and compact in its construction.

To these ends my invention consists in certain novel features, which I will now proceed to describe and will then particularly point out in the claims.

Figure 4:
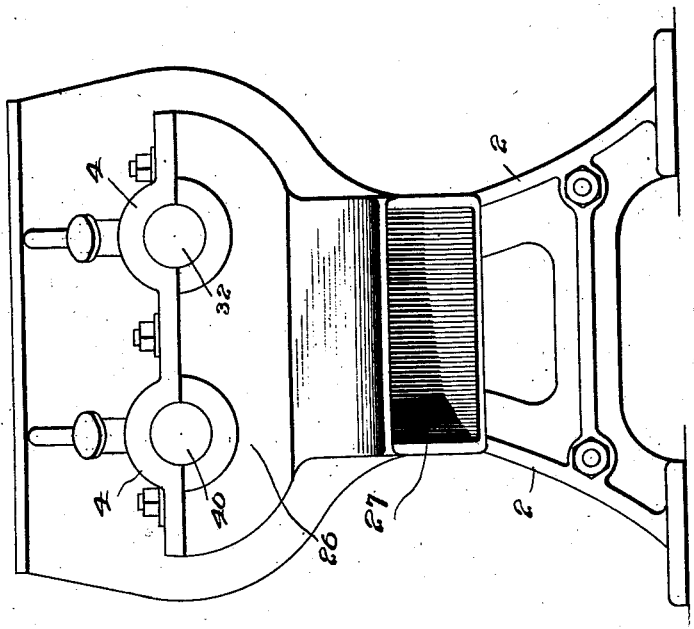
Figure 3:
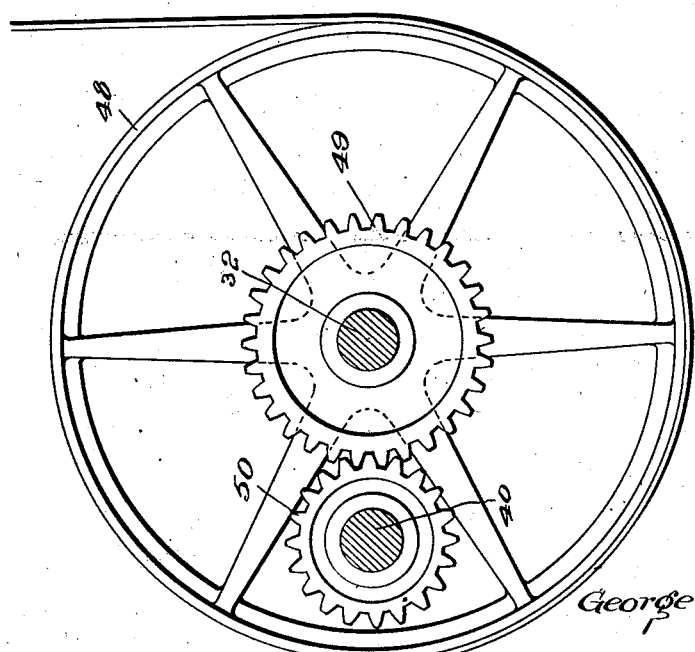
Figure 15:
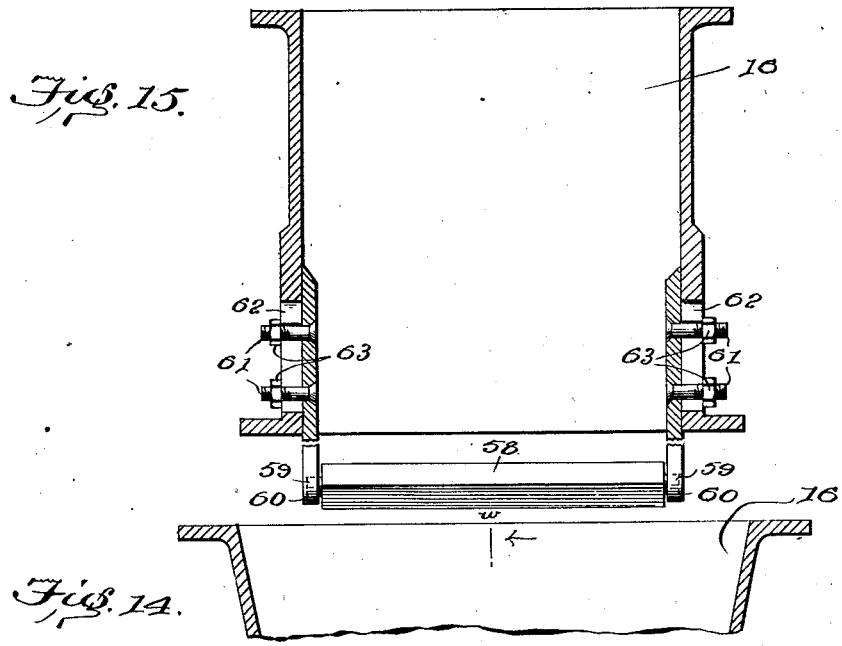
Figure 14:
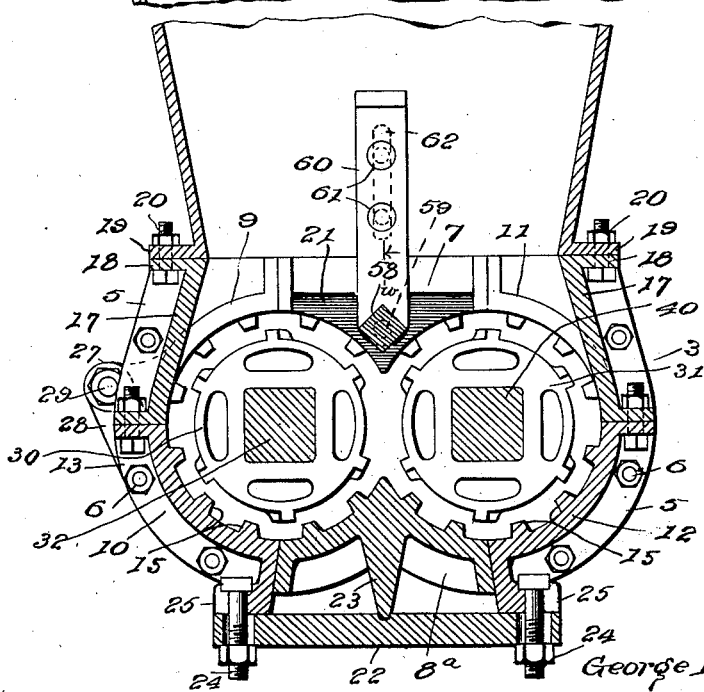

In the accompanying drawings, Figure 1 is a side elevation of a structure embodying my invention in one form. Fig. 2 is an end elevation in vertical section on the line $x\ x$ of Fig. 1 and looking in the direction of the arrows. Fig. 3 is a view of the gearing and driving-pulley, being a view in section upon the same line $x\ x$ of Fig. 1, but viewed in the opposite direction from Fig. 2. Fig. 4 is an elevation of the discharge end of the machine. Fig. 5 is a plan view of the crushing-rolls and their gearing removed from the casing. Fig. 6 is a face view of one of the disks or elements of one of the crushing-rolls. Fig. 7 is an edge view thereof. Fig. 8 is a sectional view of the same. Fig. 9 is a face view of one of the disks or elements of the other crushing-roll. Fig. 10 is a detail view thereof. Fig. 11 is a sectional view through the rolls and casing, taken on the line $y\ y$ of Fig. 1 and looking in the direction of the arrows. Fig. 12 is an end elevation of one of the staves of which the casing is composed. Fig. 13 is a partial development of the working face of the stave shown in Fig. 12, the same showing what would be seen in a plan view of a part of Fig. 12 of the full width thereof, but only a portion of its length if the curved surfaces thereof were flattened out into plane surfaces. Fig. 14 is a vertical sectional view taken on the line $z\ z$ of Fig. 1 and looking in the direction of the arrows. Fig. 15 is a vertical sectional view of the hopper and the parts carried thereby, taken on the line $w\ w$ of Fig. 14 and looking in the direction of the arrows. Fig. 16 is an end view of the support for the end of the roller-shaft bearing the driving-pulley, and Fig. 17 is a front elevation of the same.

Broadly considered, my improved crusher comprises a casing arranged horizontally, into which casing the material to be operated upon is fed from above at one end of said casing, the product being discharged at the other end of the casing, and two parallel crushing-rolls located within the casing revolving in opposite directions at differential speeds, coöperating with the casing and with each other to effect the breaking or crushing of the material, and also serving to feed the material from the receiving to the discharge end thereof.

The particular embodiment of my invention disclosed in the accompanying drawings is that which I prefer and which I will now proceed to describe. In the said drawings the machine is shown as supported upon two end frames or legs 1 and 2, suitably connected and braced apart at their lower ends and connected together at their upper ends by the casing 3, which they support. The legs are provided with bearings 4 for the roll-shafts, and the casing 3 is provided with terminal flanges 5, by means of which it is connected with the end frames by bolts 6. The casing is divided longitudinally into six staves or sections, one plane of division being horizontal and passing centrally through both rolls, the other two divisional planes being vertical and passing, respectively, through the central lines of the two rolls. Thus the body of the casing comprises an upper stave 7, a lower stave 8, two outer staves 9 and 10 to complete the housing of one of the rolls, and two similar outer staves 11 and 12 to complete the housing of the other roll. It will be noted that the upper and lower staves extend partially around both rolls, each of said staves carrying a portion of the surface of the casing coöperating with both rolls. The several stave-sections are provided with longitudinal radial flanges 13, through which connecting-bolts 14 pass to unite the several sections of the casing. The body of the casing thus forms two parallel cylindrical chambers practically circular in cross-section, but merging into each other along one side, the longitudinal opening thus formed permitting the two rolls to coöperate with each other, as well as with the inner walls of the casing.

The inner walls of the casing are provided with longitudinal ribs 15, spaced apart circumferentially a distance considerably greater than their height, as indicated more particularly in Figs. 11 and 14. These ribs are preferably not continuous from end to end of the casing; but portions of said ribs are omitted, the omissions occurring alternately in the adjacent roll-chambers, as shown in Fig. 13, which shows a development or projection of a portion of the ribs of one of the staves. This construction prevents the material from passing from one end of the casing to the other in the space between two ribs and permits it to pass around the casing as it moves from end to end thereof, thus subjecting it more fully to the action of the crushing-rolls.

In order to permit the introduction of the material into the casing, an opening is formed in the top of the casing at one end thereof. This is preferably effected by making the top stave 7 of less length than the remaining staves, said top stave extending only from the end frame 2 to the hopper 16, which surrounds the inlet-opening of the casing. The shape in cross-section of the staves 9 and 11 is also somewhat modified at the receiving-opening, said staves having their bodies extended upward, as indicated at 17 in Fig. 14, and provided with horizontal flanges 18, on which rest corresponding flanges 19, formed on the base of the hopper, bolts 20 serving to secure the hopper in position by passing through said flanges 18 and 19. The end of the stave 7 adjacent to the receiving-opening is beveled or inclined, as indicated at 21 in Fig. 14 and as shown in dotted lines in Fig. 1, so as to prevent clogging at the entrance of the body of the casing.

In order to prevent injury to the casing or rolls by means of any hard body which may be accidentally introduced into the machine, provision is made for the discharge of such body before it enters the main portion of the machine. To this end the bottom stave 8 instead of being a single piece extending the entire length of the machine is made in two sections, the main section (indicated by the numeral 8) extending from the discharge end of the machine to a point below the hopper and being secured in position by the bolts 14 and 6 in the manner already described. The other section (indicated by the reference-numeral 8ª) is coextensive in length with the receiving-opening of the casing, under which it lies, and is not bolted to the adjacent staves nor to the adjacent end frame. It fits between these parts, however, and is held in position by means of a break-bar 22, on which rests a lug or projection 23 from the stave-section 8ª. The break-bar is held in position below the casing in any suitable manner—as, for instance, by means of bolts 24 passing up through the ends of the break-bar and also through slotted lugs 25 on the staves 10 and 12, on top of which lugs the bolt-heads rest. At its discharge end the casing 3 communicates with a chamber 26, below which is located a discharge-spout 27, these parts being supported by and preferably formed in one piece with the end frame 2.

In order to facilitate inspection of the interior of the casing, the upper and lower portions thereof are made separable, the plane of division being the horizontal plane passing through the axes of the two crushing-rolls. To this end the staves 9 and 10 at one side of the machine are hinged together, the staves 9 being provided near each end with a pair of lugs 27 and the stave 10 being similarly provided with a lug 28, which fits between lugs 27, a pivot-bolt 29 passing through all three of the lugs. By removing the bolts 6, connecting the three top staves 7, 9, and 11 to the end frames, and also the bolts 14, connecting the staves 9 and 11 to the staves 10 and 12, the entire upper half of the casing may be swung over on the pivots 29, thus fully exposing the interior of the casing and giving access to the rolls.

Within the casing 3 are located the crushing-rolls, two in number, arranged parallel with each other in the two cylindrical chambers which are formed within the casing. These rolls are indicated as a whole by the reference-numerals 30 and 31, respectively. The roll 30 is mounted on a shaft 32, which shaft is in turn mounted in the bearings 4 and is provided with a fixed collar 33 at one end of the roll and a threaded portion 34 at the other end of the roll, clamping and lock nuts 35 and 36 being mounted on the threaded portion. The body of the roll 30 is composed of a plurality of disks 37, which are mounted on that portion of the shaft lying between the collar 33 and clamping-nut 35. In order to hold said disks non-rotatively on the shaft 32, that portion of said shaft mounted between said collar and nut is made non-circular in cross-section, having preferably the square form in cross-section shown, for instance, in Figs. 11 and 14. Each disk is provided with a similarly-shaped aperture 38, and the several disks are slipped upon the shaft 32 before the nuts 35 and 36 are placed in position on said shaft and are then clamped on said shaft between said collar and nuts. Each disk is provided with a plurality of teeth 39, preferably six in number, and arranged equidistantly around the periphery of the disk. Each tooth is arranged diagonally with respect to the disk and in such a position as to tend to feed the material along toward the discharge end of the machine. The disks are so constructed that the teeth of one disk lie between and alternate with the teeth of the two disks on opposite sides thereof, the teeth of any given disk being alined longitudinally of the roll with the spaces of the two adjacent disks. The roll 31 is mounted on a shaft 40, having a fixed collar 41, a threaded portion 42, clamping and lock nuts 43 and 44 on said threaded portion, and a similar square or non-circular portion between said nuts and collar. The body of the roll 31 is composed of disks 45, having non-circular apertures 46 to fit the similarly-shaped part of the shaft 40, and peripheral teeth 47, preferably corresponding in number and location with those of the disks 37. The teeth of the alternate disks 45 are arranged with respect to each other in the roll 31 in the same way as in the case of the roll 30. It will be observed, however, that the teeth 47 have a diagonal or spiral arrangement the reverse of the teeth 39, and said teeth 47 also serve to feed the material toward the discharge end of the machine, since the two rolls revolve in opposite directions.

The rolls are driven by means of a pulley 48, mounted on the shaft 32, and said shaft 32 is provided with a gear 49, which meshes with a gear 50 on the shaft 40. I prefer to make the gears 49 and 50 of different sizes, so as to impart to the rolls a differential motion, and in the present instance I have shown the gear 49 as larger than the gear 50, so that the roll 31 rotates at a higher rate of speed than the roll 30.

The shaft 32 is extended some distance beyond its bearing 4 on the end frame 1 in order to receive the pulley 48, and since said pulley is preferably of considerable size, and consequently comparatively heavy, and is also subjected to considerable strain from the driving-belt I prefer to provide a support for the extremity of the shaft 32, lying beyond the pulley 48. To this end I employ a standard 51, carrying a hanger or bracket 52, having upper and lower arms 53 and 54, in which are threaded bearing-plugs 55 and 56, which adjustably support a bearing-block 57, in which the end of the shaft 32 is mounted.

In order to insure proper feeding of the material to be operated upon from the hopper through the receiving-opening of the casing to the rolls, there is mounted in the receiving-mouth immediately above the rolls a bar 58. This bar is preferably non-circular in cross-section, the form which I prefer to give it being that shown in which the bar is square in cross-section. Said bar is adapted to rotate on its own axis, which lies in a vertical plane parallel with the vertical planes of the axes of the crushing-rolls and midway between the same, so that the bar is adapted to lie in the angle between those portions of the rolls which converge and move toward each other. Said bar is preferably adjustable toward and from the rolls, and this adjustment is preferably effected by mounting said bar in the manner shown. In this construction the bar 58 is provided at its ends with trunnions 59, which trunnions rotate in bearings in bearing-plates 60, mounted on the inner faces of the opposite walls of the hopper 16. The adjustment is effected by means of bolts 61, mounted in the bearing-plates 60 and extending through slots 62 in the hopper-walls, their projecting ends receiving nuts 63, by means of which the bearing-plates may be clamped in position after adjustment. The bar 58 effectually prevents "bridging" of the material at the receiving mouth of the casing, as the material passing downward by or carried under it into engagement with the crushing-rolls will come into contact with said bar and will impart to it a movement of rotation which effectually dislodges any material which might otherwise tend to lodge over the same and form a bridge which would prevent the material from entering the casing. This is particularly the case where the machine is operating upon corncobs or earcorn.

In operation the material to be operated upon is placed in the hopper 16, and motion being imparted to the pulley 48 the crushing-rolls 30 and 31 are rotated in opposite directions, their upper portions moving toward each other to draw the material down between the rolls, the proper feeding being insured by the bar 58. The crushing is partly accomplished by this initial passage of the material downward between the rolls and is further carried out by the passage of the material between the ribs on the interior of the casing and the teeth on the rolls, the material being carried around the two cylindrical chambers within the casing in opposite direction, and passing again and again between the rolls and being constantly fed forward toward the discharge end of the machine during the crushing operation. It will be understood that the differential speed of the rolls greatly increases the crushing effect obtained by the passage between said rolls of the material on which the machine is operating. The employment of two rolls and their coöperation with each other and with the casing within which they are inclosed materially increases the capacity of the machine and effects a uniform and rapid reduction. The provision below the receiving-mouth of the separate stave-section 8ª, yieldingly supported by the break-bar 22, prevents breakage or damage to the machine under ordinary circumstances, since any hard substance of objectionable size which enters between the rolls and this part of the casing, which is the first part thereof which it would reach, will cause the bar 22 to break before any other portion of the machine is injured and will permit the section 8ª to fall and allow the obstacle to drop out of the machine. In case of any injury of the rolls, however, only that disk or section or those disks or sections affected by the injury need to be removed, thus avoiding the necessity of discarding the entire roll, and this removal may be readily effected. The same is true of the casing, which being built up of a number of separate staves or sections only requires to be renewed as to the stave or section which may be impaired in case of injury. It will also be noted that this sectional construction permits the ready taking apart and assembling of the machine, and permits its separation into relatively small units, which materially facilitates storage and transportation.

I do not wish to be understood as limiting myself to the precise details of construction hereinbefore described and shown in the accompanying drawings, as the same may obviously be modified without departing from the principle of my invention.

Having thus fully described my invention, what I claim as new, and desire to secure by Letters Patent, is—

1. A crusher or breaker of the character described, comprising two parallel crushing-rolls between which the material passes, each of said rolls being provided with a plurality of circumferential rows of inclined teeth alternately arranged, the inclination of the teeth of the two rolls being opposite and acting to feed forward the material, means for rotating said rolls in opposite directions at differential speeds, and a casing inclosing said rolls on all sides and having its inner surface provided with longitudinal ribs or teeth coöperating with those of the rolls, said casing having an inlet or feed opening at one end only above said rolls and a discharge-outlet at the other end, substantially as described.

2. A crusher or breaker of the character described, comprising two parallel crushing-rolls between which the material passes, each of said rolls being provided with a plurality of circumferential rows of inclined teeth alternately arranged, the inclination of the teeth of the two rolls being opposite and acting to feed forward the material, means for rotating said rolls in opposite directions at differential speeds, and a casing inclosing said rolls and having its inner surface provided with longitudinal ribs or teeth coöperating with those of the rolls, said ribs or teeth being interrupted and the interruptions of one rib alternating with the projections of the adjacent ribs, said casing having an inlet or feed opening at one end above said rolls and a discharge-outlet at the other end, substantially as described.

3. In a crusher or breaker of the character described, the combination, with two parallel crushing-rolls, of a casing inclosing and coöperating with said rolls, said casing being composed of a plurality of separate staves extending longitudinally of the casing, the planes of division being one horizontal and passing through the axes of both rolls, and two vertical and passing through the axes of the respective rolls, a portion of the lower stave extending between the vertical planes of division being loosely mounted between the adjacent staves, a breakable bar supporting the loosely-mounted portion of said stave, means for separately connecting said staves, an end frame separately connected to each of said staves and supporting the casing, and bearings in said end frame, said casing having an inlet or feed opening at one end above said rolls, and a discharge-outlet at the other end, substantially as described.

4. In a crusher or breaker of the character described, the combination, with two parallel crushing-rolls revolving in opposite directions, of a casing inclosing and coöperating with said rolls and having an inlet or feed opening above said rolls, a hopper surrounding said inlet-opening, and a freely-revoluble bar supported in said inlet-opening beneath said hopper and parallel with and centrally above said crushing-rolls, substantially as described.

5. In a crusher or breaker of the character described, the combination, with two parallel crushing-rolls revolving in opposite directions, of a casing inclosing and coöperating with said rolls and having an inlet or feed opening above said rolls, a hopper surrounding said inlet-opening, and a freely-revoluble bar supported in said inlet-opening beneath said hopper and parallel with and centrally above said crushing-rolls, said bar being non-circular in cross-section, substantially as described.

6. In a crusher or breaker of the character described, the combination, with two parallel crushing-rolls revolving in opposite directions, of a casing inclosing and coöperating with said rolls and having an inlet or feed opening above said rolls, a hopper surrounding said inlet-opening, and a freely-revoluble bar supported in said inlet-opening beneath said hopper and parallel with and centrally above said crushing-rolls, said bar being polygonal in cross-section, substantially as described.

7. In a crusher or breaker of the character described, the combination, with two parallel crushing-rolls revolving in opposite directions, of a casing inclosing and coöperating with said rolls, and having an inlet or feed opening above said rolls, a hopper surrounding said inlet-opening, and a freely-revoluble bar supported in said inlet-opening parallel with and centrally above said crushing-rolls, said bar being adjustable toward and from the converging surfaces of the rolls, substantially as described.

8. In a crusher or breaker of the character described, the combination, with two parallel crushing-rolls revolving in opposite directions, of a casing inclosing and coöperating with said rolls and provided with an inlet or feed opening above the same, a hopper surrounding said feed-opening, bearing-plates mounted and vertically adjustable on said hopper, and a freely-rotating bar mounted in said bearing-plates and lying parallel with and centrally above the crushing-rolls, substantially as described.

9. In a crusher or breaker of the character described, a pair of parallel crushing-rolls, each comprising a shaft, a roll-body composed of a plurality of flat disks having their adjacent lateral faces abutting, a series of teeth extending diagonally and in a common direction across the peripheral surfaces of said disks, the teeth of the adjacent disks being arranged out of alinement and the teeth on the roll being at an angle to the teeth on the other roll and means for securing said disks on the said shaft, substantially as described.

In testimony whereof I affix my signature in presence of two witnesses.

GEORGE H. MAYNE.

Witnesses:
JEROME J. WELTY,
IRVINE MILLER.